United States Patent
Yu et al.

(10) Patent No.: US 6,524,252 B1
(45) Date of Patent: Feb. 25, 2003

(54) METHOD AND SYSTEM FOR GENERATING ULTRASOUND FRAMES WITH DECORRELATED SPECKLE PATTERNS AND GENERATING A COMPOUND ULTRASOUND IMAGE THEREFROM

(75) Inventors: Zengpin Yu, Palo Alto, CA (US); Danhua Zhao, Milpitas, CA (US); Shengtz Lin, Cupertino, CA (US); Feng Yin, Palo Alto, CA (US)

(73) Assignee: U-Systems, Inc., Los Altos, CA (US)

( * ) Notice: Subject to any disclaimer, the term of this patent is extended or adjusted under 35 U.S.C. 154(b) by 28 days.

(21) Appl. No.: 09/721,889

(22) Filed: Nov. 24, 2000

(51) Int. Cl.$^7$ ................................................ A61B 8/00
(52) U.S. Cl. ........................................................ 600/443
(58) Field of Search ........................ 600/437, 440–447, 600/458; 128/916

(56) References Cited

U.S. PATENT DOCUMENTS

| | | | |
|---|---|---|---|
| 4,887,306 A | 12/1989 | Hwang et al. | |
| 5,353,354 A | 10/1994 | Keller et al. | |
| 5,632,277 A | 5/1997 | Chapman et al. | |
| 5,653,235 A | * 8/1997 | Teo | 600/447 |
| 5,709,209 A | 1/1998 | Friemel et al. | |
| 5,782,766 A | 7/1998 | Weng et al. | |
| 5,924,991 A | * 7/1999 | Hossack et al. | 128/916 |
| 5,928,151 A | * 7/1999 | Hossack et al. | 128/916 |
| 5,957,852 A | * 9/1999 | Hossack et al. | 600/458 |
| 6,110,115 A | * 8/2000 | Ustuner et al. | 600/443 |
| 6,117,081 A | 9/2000 | Jago et al. | |
| 6,126,598 A | 10/2000 | Entrekin et al. | |
| 6,126,599 A | 10/2000 | Jago et al. | |
| 6,135,956 A | 10/2000 | Schmiesing et al. | |
| 6,193,663 B1 | * 2/2001 | Napolitano et al. | 600/447 |
| 6,358,209 B1 | * 3/2002 | Ustuner et al. | 600/443 |

OTHER PUBLICATIONS

U.S. Application Serial No. 09/224,635, filed Dec. 31, 1998.
U.S. Application Serial No. 09/449,095, filed Nov. 24, 1999.

* cited by examiner

Primary Examiner—Marvin M. Lateef
Assistant Examiner—Ali M. Imam
(74) Attorney, Agent, or Firm—Cooper & Dunham LLP

(57) ABSTRACT

An ultrasound system that generates compound images from component frames having decorrelated speckle patterns. Successive sets of distinct, speckle-affecting parameters are used to generate successive component frames for compounding, and are selected such that the successive component frames have decorrelated speckle patterns. The speckle-affecting parameters that are changed from frame to frame may be selected from a wide variety of parameters, including transmit beamformer parameters, receive beamformer parameters, and demodulator parameters. According to a preferred embodiment, the successive sets of speckle-affecting parameters differ from each other by at least two speckle-affecting parameters. According to another preferred embodiment, the amount by which each of the multiple speckle-affecting parameters is changed is less than a decorrelation threshold for that parameter, that is, by less that the amount that speckle-affecting parameter alone would be required to change in order to yield decorrelated speckle patterns if no other parameters were changed. When more speckle-affecting parameters are changed, each speckle-affecting parameter can be changed by an amount less than its decorrelation threshold, and yet decorrelated speckle patterns can still be obtained. Moreover, because two different types of speckle-affecting parameters tend to alter the spatial resolution of the component frames in different ways, the spatial resolution of the compounded image can be better as compared to the scenario in which only one speckle-affecting parameter is altered by its decorrelation threshold.

20 Claims, 6 Drawing Sheets

METHOD AND SYSTEM FOR GENERATING ULTRASOUND FRAMES WITH DECORRELATED SPECKLE PATTERNS AND GENERATING A COMPOUND ULTRASOUND IMAGE THEREFROM

FIELD

This patent specification relates to the field of ultrasound information processing systems. In particular, it relates to a method and system for generating ultrasound frames having decorrelated speckle patterns and generating compound ultrasound images therefrom.

BACKGROUND

Ultrasound imaging systems have become increasingly popular for use in medical diagnosis because they are non-invasive, easy to use, capable of real-time operation, and do not subject patients to the dangers of electromagnetic radiation. Instead of electromagnetic radiation, an ultrasound imaging system transmits sound waves of very high frequency (e.g., 1 MHz to 15 MHz) into the patient and processes echoes scattered from structures in the patient's body to derive and display information relating to these strictures.

One factor that currently limits the output quality of ultrasound imaging systems is the phenomenon of speckle. Speckle arises from the use of coherent signals to acoustically interrogate a target. Complex interference patterns arise from phase variations in the coherent signals as they propagate through, and reflect from, the many large and small acoustic reflectivity boundaries in the target. These phase variations may be caused by diffuse scatterers, by multiple scattering, by a non-homogeneous propagation medium which distorts the phase of the received wave, or by other factors.

Speckle appears to the viewer like random noise superimposed on the output image, and degrades the contrast resolution of the image (i.e., the accurate portrayal of the acoustic reflectivity of respective target locations). A speckle pattern will change in a visually recognizable (although complex) way upon a small displacement or rotation of the ultrasound transducer relative to the target, or upon small movements of the target tissue.

One common approach to reducing speckle involves image compounding, i.e., the combining of multiple component frames into an output image, the component frames having decorrelated, or at least partially decorrelated, speckle patterns. Most generally, decorrelation of the speckle patterns relates to how similar they are, or the degree to which their grainy structures appear to be derived from one another. As applied to image compounding, decorrelation of the speckle patterns relates to the degree to which compounding would reduce the speckle effects. Thus, for example, the compounding of two entirely correlated speckle patterns would cause little reduction in the amount of speckle. However, as the decorrelation of the speckle patterns is increased, compounding the patterns would result in speckle reduction, up to a maximum value when the two patterns became entirely decorrelated. It can be shown that, where direct frame averaging is used, this maximum value for speckle reduction is $\sqrt{2}$, or more generally $\sqrt{N}$ for N component frames. Mathematically, decorrelation of the two speckle patterns can be expressed by a measure such as a correlation coefficient, wherein a correlation coefficient of 1.0 corresponds to entirely correlated speckle patterns and a correlation coefficient of 0.0 corresponds to entirely decorrelated, speckle patterns.

Spatial compounding refers to the compounding of frame data from different sub-apertures and/or angular viewpoints for a given target location. Examples of spatial compounding from different angular viewpoints ("look angles") can be found in U.S. Pat. No. 6,117,081 (Jago et. al.), U.S. Pat. No. 6,126,598 (Entrekin et. al.), U.S. Pat. No. 6,126,599 (Jago et. al.), and U.S. Pat. No. 6,135,956 (Schmiesing et. al.), which are incorporated by reference herein. There is a trade-off between speckle reduction and spatial resolution in such systems. For example, when using different sub-apertures, it is generally required that the relative translation of the sub-apertures be more than one-half the size of the sub-apertures to yield decorrelated speckle patterns. However, if more sub-apertures were formed to achieve this spacing, there would be a corresponding decrease in the spatial resolution of each component frame as the size of each aperture is decreased. Alternatively, if panoramic or extended view imaging is used to achieve a speckle reduction effect, image registration errors substantially reduce the spatial resolution.

Similar disadvantages are incurred in angular compounding systems such as those listed above, in which frames are taken from different "look angles" and compounded. As described therein, it is required that the "look angles" of the component frames be at least several degrees apart to achieve sufficiently decorrelated speckle patterns. However, as the angular separation of the "look angles" increases, there are beam steering and registration errors that reduce spatial resolution, as well as effective aperture reductions that reduce spatial resolution. Moreover, these errors get worse as the angles deviate further from the normal to the transducer, because small beam steering errors take on increased significance at these angles. Finally, these angular compounding systems suffer from grating lobes due to aliasing effects.

Frequency compounding is accomplished by dividing the bandwidth of the imaging system into multiple bands, and then processing and compounding signals from the different frequency bands. There is a trade-off between axial resolution and speckle reduction in these systems. For increased speckle reduction, it is desirable that the frequency bands of the interrogating pulses have lesser overlap in the frequency domain. However, to achieve this lesser overlap, the bandwidth of the interrogating pulses needs to be narrower, which corresponds to increased pulse length in the time domain and therefore reduced axial resolution. Frequency compounding also causes lateral resolution degradation due to contributions from the lower frequency component, thereby further decreasing spatial resolution.

Temporal compounding involves averaging successive frames together into a compound image. Because only one acoustic pulse can be sent into the target at a time, the above spatial compounding and frequency compounding techniques inherently involve temporal compounding as well. In theory, "pure" temporal compounding—in which no locations, angles, or frequencies are changed between frames—may not reduce speckle at all because the speckle pattern should not change between frames. In practice, however, many tissues and scattering structures incur a small amount of movement between component frames (e.g., through respiratory movements, gastric movements, small muscle movements, etc.) such that speckle patterns can change continually between component frames. Because no transducer movement, angle changes, or frequency changes are incurred between component frames, "pure" temporal compounding involves little or no loss of spatial resolution.

However, spatial compounding, frequency compounding, and temporal compounding each involve an additional tradeoff between speckle reduction and temporal resolution, i e., the ability to "keep up" with moving tissue and/or a moving transducer. As more frames "N" are compounded to reduce speckle, the output image becomes increasingly blurry for locations of relative movement between the transducer and the target tissue, and/or the output frame rate is decreased.

Proposals have been made for dealing with the undesirable tradeoffs between speckle reduction and spatial and/or temporal resolution. For example, the '598 patent supra proposes a dynamic trade off between the blurring effect and the speckle effect, wherein the number of spatially compounded frames "N" is automatically reduced during fast tissue or transducer motion. The '081 patent supra proposes a substitute tradeoff, one between the blurring effect and the frame rate, wherein the "N" frames being compounded are first corrected for misregistration prior to compounding, albeit causing a concomitant reduction in output frame rate, and calling for a substantial increase in processing power and system complexity.

However, it is believed that these and other such proposals can be seen as representing "patches" for fundamental shortcomings in the current ways that speckle is dealt with. In accordance with the preferred embodiments, it is believed that speckle effects can be more effectively reduced by systematically dealing with the many parameters that affect the speckle patterns themselves.

Accordingly, it would be desirable to provide an ultrasound imaging system that provides for reduced speckle while reducing the degradation in spatial resolution associated with image compounding.

It would be further desirable to provide an ultrasound imaging system that provides for reduced speckle while reducing the degradation in temporal resolution associated with image compounding.

It would be further desirable to provide an ultrasound imaging system that provides for reduced speckle that does not substantially increase the complexity of conventional image-compounding ultrasound systems.

SUMMARY

In accordance with a preferred embodiment, an ultrasound system that generates compound images from component frames having decorrelated speckle patterns is provided. Successive sets of distinct, speckle-affecting parameters are used to generate the successive component frames for compounding, and are selected such that the successive component frames have decorrelated speckle patterns. The speckle-affecting parameters that are changed from frame to frame can be selected from a wide variety of parameters, including transmit beamformer parameters, receive beamformer parameters, and demodulator parameters. The speckle-affecting parameters that are changed from frame to frame include, but are not limited to, transmit frequency, number of transmit cycles, number of transmit zones, transmit pulse shape, transmit focus profile, transmit focal point, transmit steering angle, transmit F-number, transmit focus algorithm identifier, transmit aperture setting, transmit apodization profile, receive bandwidth, receive focus profile, receive focal point, receive steering angle, receive F-number, receive focus algorithm identifier, receive aperture setting, receive apodization profile, local oscillator frequency, and receive pulse shape.

According to a preferred embodiment, the successive sets of speckle-affecting parameters differ from each other by at least two speckle-affecting parameters for enhancing the decorrelation of the successive component frames, thereby providing for improved contrast resolution in the compounded image. According to another preferred embodiment, the amount by which each of the multiple speckle-affecting parameters is changed is less than a decorrelation threshold for that parameter. A decorrelation threshold relates to an amount that a speckle-affecting parameter alone would be required to change in order to yield decorrelated speckle patterns, if no other parameters were changed. It has been found that when more speckle-affecting parameters are changed, each speckle-affecting parameter can be changed by an amount less than its decorrelation threshold, and yet decorrelated speckle patterns can still be obtained. Moreover, because two different types of speckle-affecting parameters tend to alter the component frames in different ways, it has been found that the spatial resolution of the compounded image can be better as compared to the scenario in which only one speckle-affecting parameter is altered by its decorrelation threshold.

In one example of the above preferred embodiment, a partial frequency compounding method and system is provided. According to a preferred method, the difference in transmit frequency between successive frames is only a partial fraction of the difference that would otherwise be required to establish speckle pattern decorrelation if only transmit frequency, and no other parameter, were changed. However, according to a preferred method, an additional speckle-affecting parameter is also changed between successive frames by an amount sufficient to yield decorrelated speckle patterns when changed in conjunction with the transmit frequency. Thus, as a conceptual example, if the transmit frequency would alone need to be changed from $f_0$ to $1.5f_0$ to establish decorrelated speckle patterns, then according to the preferred embodiments, the transmit frequency could be only changed from $f_0$ to $1.2f_0$ as long as the number of transmit cycles, for example, were changed from $n_0$ to $1.5n_0$ at the same time. Moreover, because the resulting component frames are changed in different ways by the transmit frequency change versus the transmit cycle change, the spatial resolution of the compounded result can be better than if only the transmit frequency were changed from $f_0$ to $1.5f_0$ between component frames.

DETAILED DESCRIPTION

Figure 1:
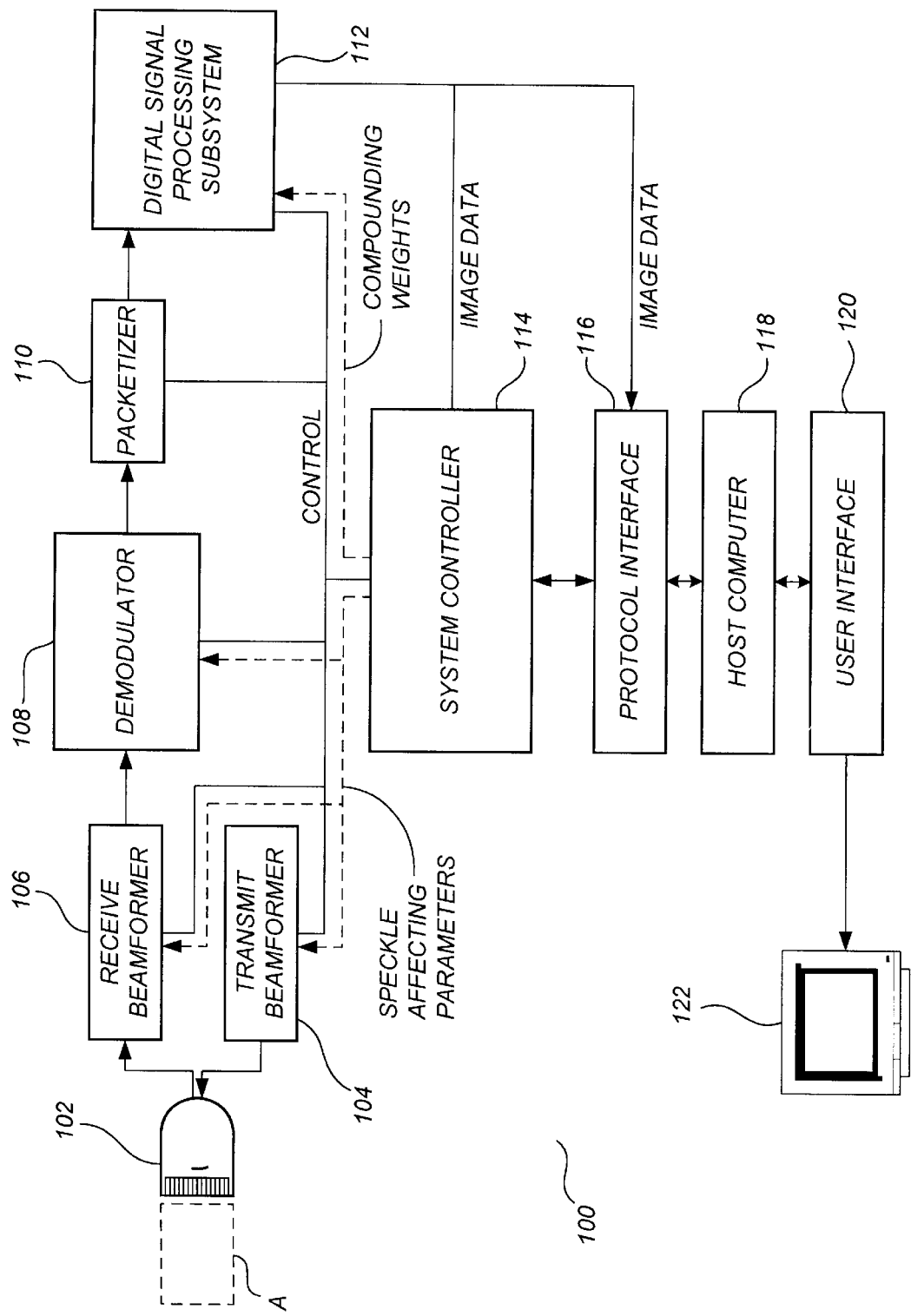
FIG. 1 shows a block diagram of an ultrasound imaging system in accordance with a preferred embodiment.

FIG. 1 shows a block diagram of an ultrasound imaging system 100 in accordance with a preferred embodiment. Ultrasound imaging system 100 comprises a transducer 102, a transmit beamformer 104, a receive beamformer 106, a demodulator 108, a packetizer 110, a digital signal processing (DSP) subsystem 112, a system controller 114, a protocol interface 116, a host computer 118, a user interface 120, and a display 122. Although many ultrasound system architectures may be readily adapted for use in accordance with the preferred embodiments, ultrasound imaging system 100 is preferably similar to the those described in the commonly assigned U.S. Ser. No. 09/224,635, filed Dec. 31, 1998, and U.S. Ser. No. 09/449,095 filed Nov. 24, 1999, which are incorporated herein by reference.

Transducer 102 comprises an array of transducer elements that transmits focused acoustic signals into a target responsive to signals generated by the transmit beamformer 104. In a preferred embodiment, transducer 102 transmits acoustic pulses into an area A that is fixed relative to the transducer. It has been found that using methods of the preferred embodiments, the use of angular spatial compounding, in which component frames are taken at different angles relative to the transducer, can be avoided. In the preferred embodiment in which angular spatial compounding is avoided, several disadvantages associated with angular spatial compounding that degrade spatial resolution in the compound image are avoided. Nevertheless, it is possible to use angular spatial compounding methods in conjunction with the preferred embodiments for other reasons.

Responsive to control signals and parameters received from system controller 114, transmit beamformer 104 generates signals that are converted into acoustic interrogation signals by transducer 102 and introduced into the target. Transducer 102 also receives acoustic echoes from the target and converts them into signals for forwarding to receive beamformer 106. Receive beamformer 106 receives the signals and converts them into a single-channel RF signal. Demodulator 108 receives the single-channel RF signal and generates component frames therefrom, which are then packetized by packetizer 110 and fed to DSP subsystem 112. In accordance with control signals and compounding weights received from system controller 114, DSP subsystem 112 continuously generates compound output images by compounding "N" component frames at a time. The output image data is transferred to protocol interface 116, but may optionally be further processed by system controller 114. The compound output image frames are then transferred to host computer 118 which performs scan conversion on the signals for transmission to user interface 120 and ultimate display by display 122.

The transmit beamformer 104, receive beamformer 106, and demodulator 108 perform their processing functions on successive component frames in accordance with a plurality of successive sets of speckle-affecting parameters. Speckle-affecting parameters relate to settings or other parameters used by the ultrasound system 100 which, if changed, would result in a change in the speckle pattern of the generated component frames. Speckle-affecting parameters are provided by system controller 114 to each of the transmit beamformer 104, receive beamformer 106, and demodulator 108 either dynamically or in a fixed predetermined sequence. It has been found that the alternating use of as few as two sets of speckle-affecting parameters between component frames, each differing by as little as two individual speckle-affecting parameters, may provide for an increased quality output having increased spatial resolution as compared to a scenario in which only one individual speckle-affecting parameter is changed between component frames.

According to a preferred embodiment, the amount by which each of the multiple speckle-affecting parameters is changed is less than a decorrelation threshold for that parameter. A decorrelation threshold relates to an amount that a speckle-affecting parameter alone would be required to change in order to yield decorrelated speckle patterns, if no other parameters were changed. By way of nonlimiting conceptual example, in a system having an initial transmit frequency of $f_0$, it may be found that the transmit frequency needs to be changed to at least $1.5f_0$ in order to yield decorrelated speckle patterns between the two resulting frames. In such case, the decorrelation threshold for the transmit frequency parameter at $f_0$ would be $0.5f_0$. Generally speaking, decorrelation thresholds for each of the many speckle-affecting parameters may be empirically determined by holding all other speckle-affecting parameters constant while varying that parameter, and evaluating whether the resulting component frames are sufficiently decorrelated. The decorrelation threshold for a given speckle-affecting parameter may also vary depending on the magnitude of that parameter. However, given the present disclosure, a person skilled in the art will be readily able to determine the relevant decorrelation thresholds for the speckle-affecting parameters of a given ultrasound system configuration.

In accordance with a preferred embodiment, when multiple speckle-affecting parameters are changed between component frames, each individual speckle-affecting parameter may be changed by an amount less than its decorrelation threshold, and yet decorrelated speckle patterns can still be obtained. Importantly, because two different types of speckle-affecting parameters tend to alter the component frames in different ways, it has been found that the spatial resolution of the compound image is better as compared to the scenario in which only one speckle-affecting parameter is altered by its decorrelation threshold. Thus, continuing the above conceptual example, the transmit frequency might be changed between frames only by an amount $0.2f_0$ (which is less than the above decorrelation threshold of $0.5f_0$), as long as another speckle-affecting parameter, for example, the number of transmit cycles, were changed as well, e.g., from $n_0$ to $1.5n_0$. In this example, since the transmit frequency is changed by a smaller amount $0.2f_0$, there is a lesser change in the axial resolution of the respective component frames as compared to a transmit frequency change of $0.5f_0$. Furthermore, the change in the number of transmit cycles by $0.5n_0$, while affecting the component frames in some way, will generally affect the component frames in a way that is different than the change in axial resolution. When the compound image is formed by the component frames, it is found that the spatial resolution of the resulting compound image can be better than the compound image resulting if only the transmit frequency were changed from $f_0$ to $1.5f_0$ between frames.

It is to be appreciated that the above example is a conceptual example only and is introduced to clearly communicate the features and advantages of the preferred embodiments. The actual speckle-affecting parameter selection and the actual speckle-affecting parameter values will be highly system dependent, and therefore the above numerical examples may, or may not, be effective in any given specific ultrasound system. However, upon reading the present disclosure, a person skilled in the art will be readily able to identify which sets of speckle-affecting parameters, and which values and value changes thereof, will result in enhance spatial resolution of the compound image in any specific ultrasound system without undue experimentation.

Advantageously, because decorrelation of the component frames is enhanced by the toggling of several speckle-affecting parameters at once, the number of component frames "N" needed generate a reduced-speckle compounded result may be decreased. Accordingly, the temporal resolution of an ultrasound system in accordance with the preferred embodiments may likewise be increased as compared to prior art systems.

Figure 2:
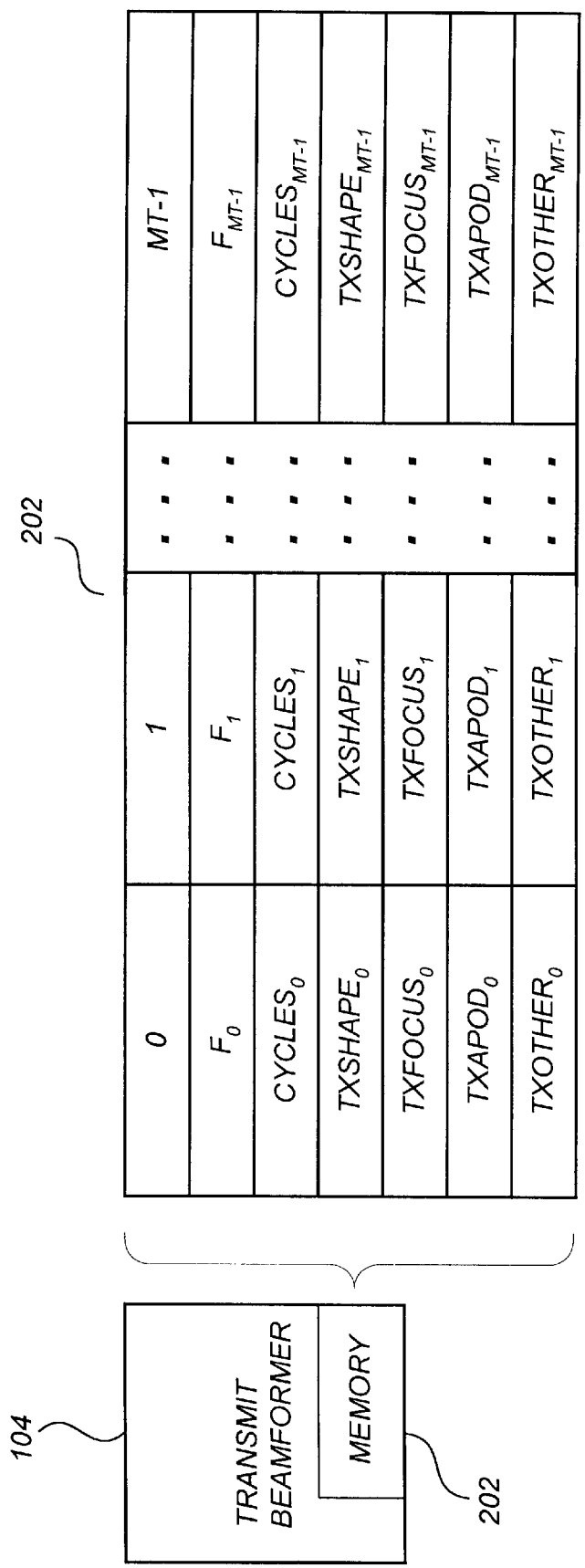
FIG. 2 shows a transmit beamformer as adapted for use in the system of FIG. 1, along with an array of transmit beamformer speckle-affecting parameters in accordance with a preferred embodiment.

FIG. 2 shows transmit beamformer 104 as adapted for use in the system of FIG. 1 comprising a memory 202 for storing transmit beamformer speckle-affecting parameters in accordance with a preferred embodiment. As shown in FIG. 2, memory 202 comprises a predetermined number MT of sets of speckle-affecting parameters. In a configuration in which receive beamformer and demodulator speckle-affecting parameters are not varied between component frames, the predetermined number MT may be as little as 2, or may be several times greater as may be empirically determined to yield the best results for specific machines or systems. For a first component frame k, the $0^{th}$ column of speckle-affecting parameters from memory 202 is used; for a second component frame k+1, the $1^{st}$ column is used, and so on up to component frame k+MT−1, in which case the $(MT-1)^{st}$ column is used. For the frame k+MT, the $0^{th}$ column is re-used, and so on. In general, for a $k^{th}$ component frame, the (k mod MT)$^{th}$ column of speckle-affecting parameters from memory 202 is used to process that frame. It is to be appreciated, however, that if receive beamformer and/or demodulator speckle-affecting parameters are varied between component frames, the number MT may be 1, representing the case in which transmit beamformer speckle-affecting parameters are not varied between frames.

For a given column "i" of memory array 202, the transmit beamformer speckle-affecting parameters include a transmit frequency $F_i$ and a number of transmit cycles $CYCLES_i$. For single-zone transmitting, the transmit frequency $F_i$ and number of transmit cycles $CYCLES_i$ are scalar quantities used for the entire frame. For multi-zone transmitting, in which the component frame is formed from a number $ntz_i$ of separate transmit zones, $F_i$ and $CYCLES_i$ are linear arrays of length $ntz_i$, each element representing the transmit frequency and number of transmit cycles, respectively, for its respective transmit zone.

The transmit beamformer speckle-affecting parameters further include a transmit pulse shape parameter, an array $TXSHAPE_i$. For single-zone transmitting, $TXSHAPE_i$ is a linear array of $nts_i$ elements, where $nts_i$ represents the number of transmit cycles being weighted. In general, $nts_i$ will be related to $CYCLES_i$. Generally, the values of $TXSHAPE_i$ are weightings applied to the transmit pulses that may form different pulse shapes, such as rectangular (the default), Gaussian, Hamming, cosine, triangular, or other shapes. As an alternative to setting the transmit pulse shape parameter by specific weightings, the transmit beamformer 104 may store a number of pre-set transmit pulse shapes, which may then simply be identified by scalar indicators such RECTANGULAR, $GAUSSIAN_1$, $GAUSSIAN_2$, $HAMMING_1$, $HAMMING_2$, and so on. For multi-zone transmitting, the array $TXSHAPE_i$ will be a two-dimensional array having $ntz_i$ rows, each row representing the transmit pulse shape parameter for its respective transmit zone.

The transmit beamformer speckle-affecting parameters further include a transmit focus profile, an array $TXFOCUS_i$. In its most general form, for single-zone transmitting $TXFOCUS_i$ will be a linear array of $ntd_i$ members, where $ntd_i$ corresponds to the number of transducer elements and each member of $TXFOCUS_i$ corresponds to delay amounts for each transducer element. However, as a more common alternative to directly setting the individual delays, the transmit beamformer 104 may store a number of preset parameter sets corresponding to different transmit focus profile characteristics, which may then be represented by a simple identifier or scalar parameter in the array $TXFOCUS_i$. Transmit focus profile parameters include, for example, a transmit focal point relating to a focusing distance, a transmit steering angle, a transmit F-number relating to beam width, a transmit focus algorithm identifier (e.g., spherical, line, etc.), and a transmit aperture setting relating to which transducer elements are active. For multi-zone transmitting, $TXFOCUS_i$ will have an additional dimension of length $ntz_i$, where $ntz_i$ is the number of transmit zones.

The transmit beamformer speckle-affecting parameters further include a transmit apodization profile, an array $TXAPOD_i$. For single-zone transmitting, $TXAPOD_i$ is a linear array of $nta_i$ elements, where $nta_i$ represents the number of transducer elements being weighted. As an alternative to setting the individual transducer element weightings, the transmit beamformer 104 may store a number of preset apodization profiles, which may then simply be identified by their type. For multi-zone transmitting, the array $TXAPOD_i$ will be a two-dimensional array having $ntz_i$ rows, each row representing the apodization profile for its respective transmit zone. The transmit beamformer speckle-affecting parameters further include other parameters $TXOTHER_i$ known to affect the speckle pattern of the component frames.

Figure 3:
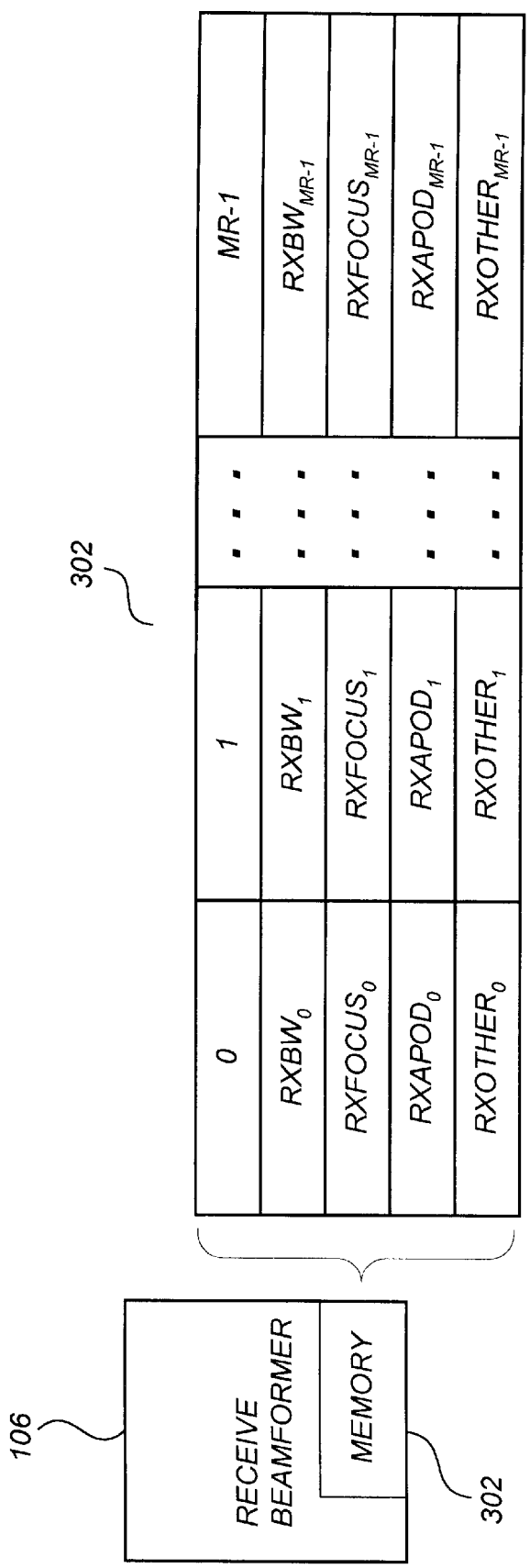
FIG. 3 shows a receive beamformer as adapted for use in the system of FIG. 1, along with an array of receive beamformer speckle-affecting parameters in accordance with a preferred embodiment.

FIG. 3 shows a receive beamformer 106 as adapted for use in the system of FIG. 1 comprising a memory 302 for storing receive beamformer speckle-affecting parameters in accordance with a preferred embodiment. The memory 302 of FIG. 3 comprises a predetermined number MR of sets of speckle-affecting parameters. Similar to the operation of transmit beamformer 104, the (k mod MR)$^{th}$ column of speckle-affecting parameters from memory 302 is used to process the $k^{th}$ component frame. In a configuration in which transmit beamformer and demodulator speckle-affecting parameters are not varied between component frames, the predetermined number MR may be as little as 2, or may be several times greater as may be empirically determined to yield the best results. However, if MT is greater than 1 and/or demodulator speckle-affecting parameters are varied between component frames, the number MR may be 1, representing the case in which receive beamformer speckle-affecting parameters are not varied between frames.

For a given column "i" of memory array 302, the receive beamformer speckle-affecting parameters include a receive bandwidth $RXBW_i$. For single-zone receiving, the receive bandwidth $RXBW_i$ is a scalar quantity used for the entire frame. For multi-zone receiving, in which the component frame is formed from a number $nrz_i$ of separate receive zones, $RXBW_i$ is a linear array of length $nrz_i$, each element representing the receive bandwidth for its respective receive zone.

The receive beamformer speckle-affecting parameters further include a receive focus profile, an array $RXFOCUS_i$ that is a receive beamformer counterpart to the transmit focus profile $TXFOCUS_i$. In its most general form, for single-zone receiving $RXFOCUS_i$ will be a linear array of $nrd_i$ members. As with the transmit beamformer, the receive focus profile $RXFOCUS_i$ may comprise individual delay values, or as a more common alternative to directly setting the individual delays, the receive beamformer 106 may store a number of preset parameter sets corresponding to different receive focus profile characteristics, which may then be represented by a simple identifier or scalar parameter in the array $RXFOCUS_i$. Receive focus profile parameters include, for example, a receive focal point relating to a focusing distance, a receive steering angle, a receive F-number relating to beam width, a receive focus algorithm identifier (e.g., spherical, line, etc.), and a receive aperture setting relating to which transducer elements are active. For multi-zone receiving, $RXFOCUS_i$ will have an additional dimension of length $nrz_i$, where $nrz_i$ is the number of receive zones.

The receive beamformer speckle-affecting parameters further include a receive apodization profile, an array $RXAPOD_i$. For single-zone receiving, $RXAPOD_i$ is a linear array of $nra_i$ elements, where $nra_i$ represents the number of transducer elements being weighted. As an alternative to setting the individual transducer element weightings, the receive beamformer 106 may store a number of preset apodization profiles, which may then simply be identified by their type. For multi-zone receiving, the array $RXAPOD_i$ will be a two-dimensional array having $nrz_i$ rows, each row representing the apodization profile for its respective receive zone. The receive beamformer speckle-affecting parameters further include other parameters $RXOTHER_i$ known to affect the speckle pattern of the component frames.

Figure 4:
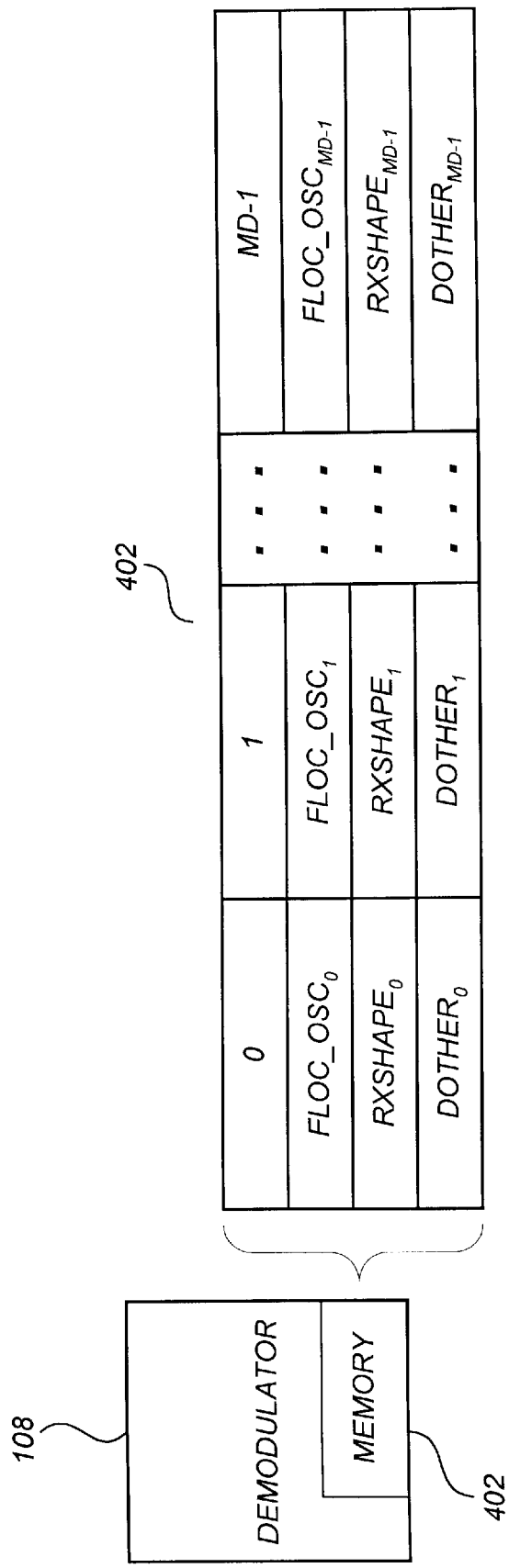
FIG. 4 shows a demodulator as adapted for use in the system of FIG. 1, along with an array of demodulator speckle-affecting parameters in accordance with a preferred embodiment.

FIG. 4 shows a demodulator 108 as adapted for use in the system of FIG. 1 comprising a memory 402 for storing demodulator speckle-affecting parameters in accordance with a preferred embodiment. The memory 402 of FIG. 4 comprises a predetermined number MD of sets of speckle-affecting parameters. Similar to the operation of transmit beamformer 104 and receive beamformer 106, the (k mod MD)$^{th}$ column of speckle-affecting parameters from memory 402 is used to process the k$^{th}$ component frame. In a configuration in which transmit beamformer and receive beamformer speckle-affecting parameters are not varied between component frames, the predetermined number MD may be as little as 2, or may be several times greater as may be empirically determined to yield the best results. However, if MT is greater than 1 and/or MR is greater than 1, the number MD may be 1, representing the case in which demodulator speckle-affecting parameters are not varied between frames.

For a given column "i" of memory array 402, the demodulator speckle-affecting parameters include a local oscillator frequency $FLOC_{13\ OSCi}$. For single-zone receiving, the local oscillator frequency $FLOC_{13\ OSCi}$ is a scalar quantity used for the entire frame. For multi-zone receiving, in which the component frame is formed from a number $nrz_i$ of separate receive zones, $FLOC_{13\ OSCi}$ is a linear array of length $nrz_i$, each element representing the local oscillator frequency for its respective receive zone The demodulator speckle-affecting parameters further include a receive pulse shape parameter, an array $RXSHAPE_i$ of $nrs_i$ elements analogous to the array $TXSHAPE_i$ of transmit beamformer 104. The demodulator speckle-affecting parameters further include other parameters $DXOTHER_i$ known to affect the speckle pattern of the component frames.

Figure 5:
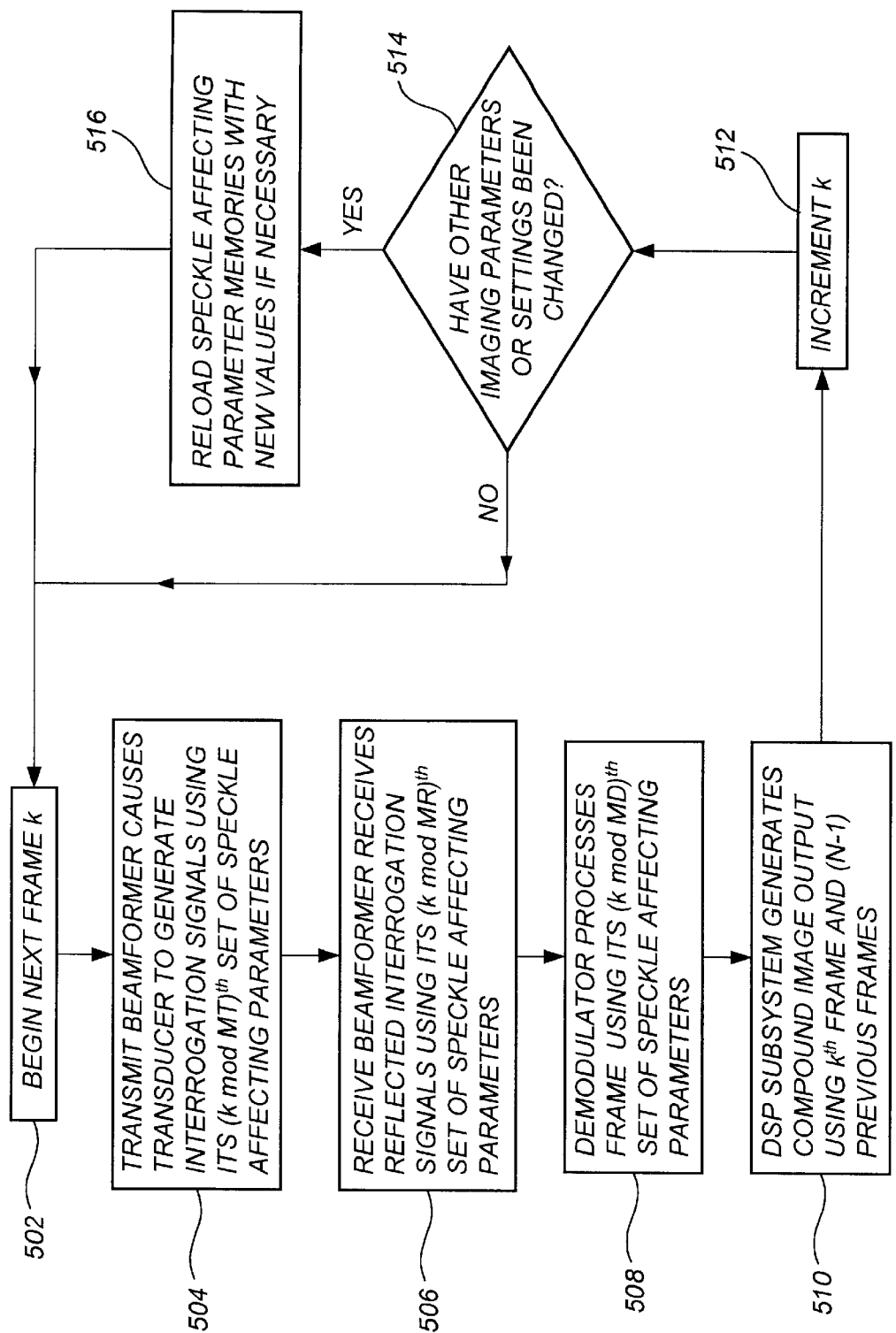
FIG. 5 shows overall steps carried out by the system of FIG. 1 in generating compound ultrasound images and managing speckle-affecting parameters in accordance with a preferred embodiment.

FIG. 5 shows overall main steps carried out by the system of FIG. 1 in generating a compound ultrasound image and managing speckle-affecting parameters in accordance with a preferred embodiment. At step 502, processing of a next frame k begins. At step 504, using the values in its memory 202, transmit beamformer 104 causes transducer 102 to generate interrogation signals using is (k mod MT)$^{th}$ set of speckle-affecting parameters. At step 506, receive beamformer 106 receives signals corresponding to reflected acoustic signals from the transducer 102 and, using the values in its memory 302, generates a single channel RF signal using its (k mod MR)$^{th}$ set of speckle-affecting parameters. At step 508, demodulator 108 processes the received signal into a k$^{th}$ component frame using its (k mod MD)$^{th}$ set of speckle-affecting parameters.

At step 510, DSP subsystem 112 generates the compound image output using the k$^{th}$ frame in conjunction with (N−1) previous component frames, where N is the number of component frames being compounded. The preferred compounding method is described infra with respect to FIG. 6, although other compounding methods may be used. At step 512, the frame counter k is incremented. At step 514, the system controller 114 determines whether other imaging parameters or settings in the ultrasound system 100 have been changed. If not, processing of the next frame continues at step 502. If so, at step 516, new speckle-affecting parameters are loaded into the respective memories 202, 302, and 402 if necessary to correspond to the new system parameters. In one preferred embodiment, the system controller computes a new value for "N," the number of frames being compounded, based on the new imaging parameters or settings, and then changes the speckle-affecting parameters in the respective memories 202, 302, and 402 according to the new value for "N." As an example, the number "N" may be varied to maintain a given output frame rate which, in turn, can be dependent on a variety of factors, such as display depth, number of transmit focal zones, display mode (e.g. B-mode, color Doppler, power Doppler), or other factors.

Figure 6:
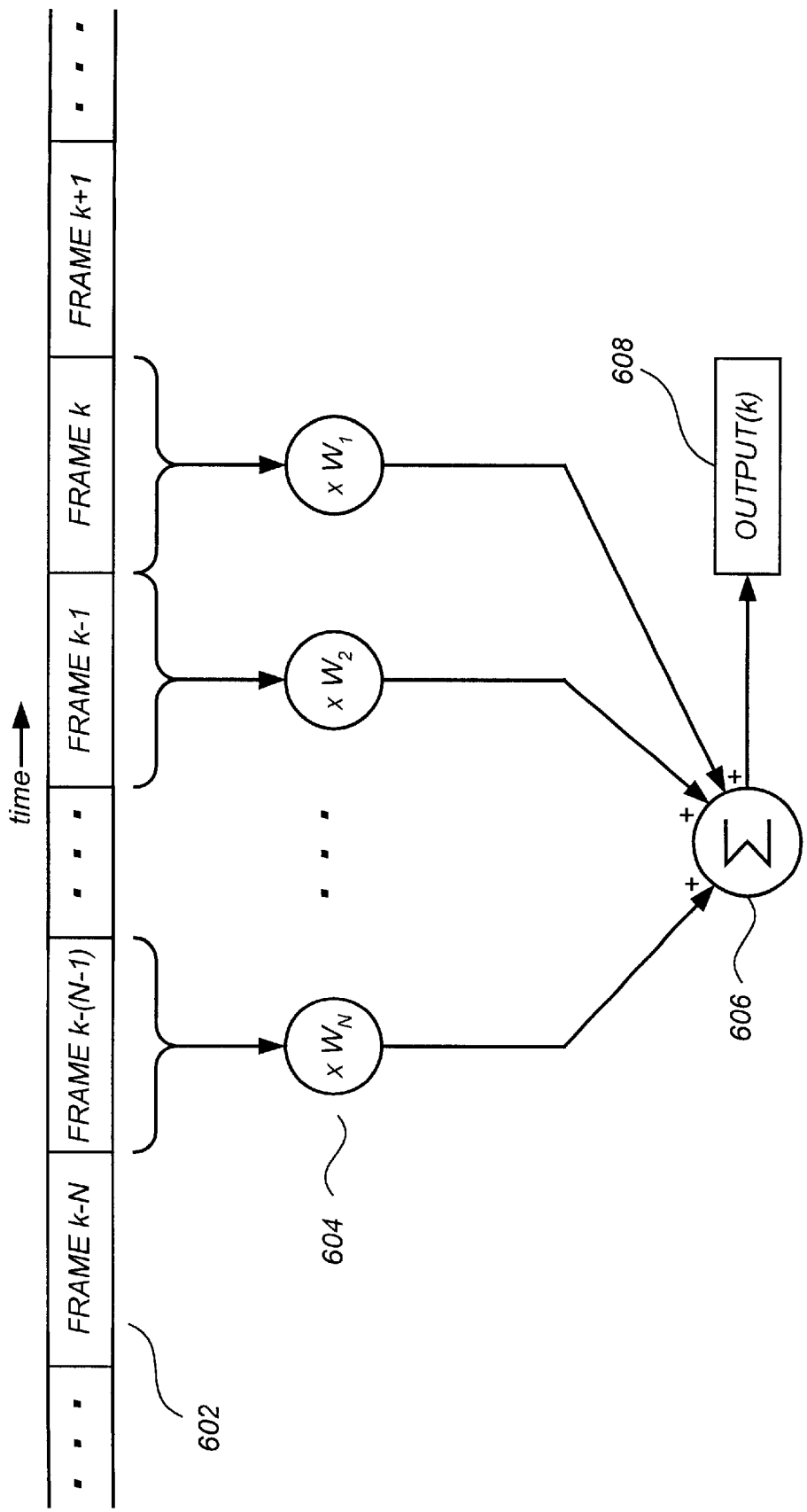
FIG. 6 shows a conceptual diagram illustrating the creation of compound images using decorrelated component frames in accordance with a preferred embodiment.

FIG. 6 shows a conceptual diagram illustrating the creation of compound images using statistically decorrelated component frames in accordance with a preferred embodiment. Preferably, as shown in FIG. 6, the decorrelated component frames are compounded by DSP subsystem 112 using a finite impulse response (FIR)-like method, such that the output frame rate of the compounded images is as great as the acquisition frame rate of the component frames. Shown in FIG. 6 is a time sequence of frames 602 which, at a point in time k, are independently weighted by the weighting factors 604 as shown in FIG. 6, and then summed by an accumulation device 606 to produce the k$^{th}$ compound output image 608. While the next frame k+1 is included in the computation of the (k+1)$^{st}$ compound output image, the [k-(N−1)]$^{st}$ frame is dropped from inclusion in the compounding step. In this way, the output frame rate of the compounded images is as high as the acquisition frame rate of the component frames. The weighting factors 604 may be scalar amounts, or may alternatively be two-dimensional arrays for weighting the frames on a per-location basis.

Tables 1 and 2 below show exemplary sets of speckle-affecting parameters, along with frame weightings, that may be used in accordance with the preferred embodiments. These particular numerical values are useful in a system having the commercial designation USI-2000 by U-Systems, Inc. of Los Altos, Calif.

TABLE 1

Speckle-Affecting Parameter Changes and Compounding Weights
(MT = 2; MR = 1; MD = 1; 7.5 MHz Transducer)

| Frame Id | Parameters Adjusted | Weighting Parameter |
|---|---|---|
| 1 | Focus = 2 cm, 4 cm, 6 cm<br>F number = 2.0<br>Number of transmit cycles = 1<br>Apodization = HAMMING1 | 0.5 |

TABLE 1-continued

Speckle-Affecting Parameter Changes and Compounding Weights
(MT = 2; MR = 1; MD = 1; 7.5 MHz Transducer)

| Frame Id | Parameters Adjusted | Weighting Parameter |
| --- | --- | --- |
| 2 | Focus = 3 cm, 5 cm, 7 cm<br>F number = 2.5<br>Number of transmit cycles = 2<br>Apodization = HAMMING2 | 0.5 |

TABLE 2

Speckle Affecting Parameter Changes and Compounding Weights
(MT = 4; MR = 1; MD = 1; 10 MHz Transducer)

| Frame Id | Parameters Adjusted | Weighting Parameter |
| --- | --- | --- |
| 1 | Focus = 1 cm, 3 cm<br>Transmit Frequency = 7 MHz | 0.2 |
| 2 | Focus = 2 cm, 4 cm<br>Transmit Frequency = 8 MHz | 0.2 |
| 3 | Focus = 1.5 cm, 3.5 cm<br>Transmit frequency = 9 MHz | 0.3 |
| 4 | Focus = 2.5 cm, 4.5 cm<br>Transmit Frequency = 10 MHz | 0.3 |

Again, it is to be appreciated that the above examples are introduced only to clearly communicate the features and advantages of the preferred embodiments. The actual speckle-affecting parameter selection and the actual speckle-affecting parameter values will be highly system dependent, and therefore the above numerical examples may, or may not, be effective in any given specific ultrasound system. However, upon reading the present disclosure, a person skilled in the art will be readily able to identify which sets of speckle-affecting parameters, and which values and value changes thereof, will result in enhance spatial resolution of the compound image in any specific ultrasound system.

In one alternative preferred embodiment in which the concept of speckle-affecting parameter toggling is taken one step further, the frame quality may be increased by the altering the "tuning" of certain speckle-affecting parameters with respect to each other within a single firing. Normally, certain speckle-affecting parameters in one component of the ultrasound system, e.g., the local oscillator frequency used by demodulator 108, is "tuned" to a different speckle-affecting parameter used by a different component of the ultrasound system 100, e.g., the transmit frequency used by transmit beamformer 104. It has been found that such intra-frame parameters may be "detuned" from each other to alter the speckle patterns. In one example of this alternative preferred embodiment, subharmonic frequency compounding is used, wherein the local oscillator frequency used by the demodulator 108 is selected to be near a subharmonic, say $0.5f_0$, of the of the transmit frequency $f_0$ of the transmit beamformer 104. When compounded with other component frames generated without using a subharmonic local oscillator frequency, the result may be further enhanced. In one preferred embodiment, the component frame generated using a location oscillator frequency of $0.5f_0$ may be combined with a component frame generated using a harmonic of $f_0$, say, $2f_0$ and then compounded to form a compound output image.

In another preferred embodiment, more than one receive beamformer and/or demodulator may be implemented in parallel for processing signals corresponding to the $k^{th}$ component frame using different speckle-affecting parameters, with the results being compounded together and also compounded with the results for component frames k−1, k−2, etc., which were in turn processed using different speckle-affecting parameters. Thus, for example, a first receive beamformer having two sets of speckle-affecting parameters ($SP1_0$ and $SP1_1$) in its memory may process component frames k and k+1 using the speckle-affecting parameter sets $SP1_0$ and $SP1_1$, respectively. The single-channel RF signals are processed by a first parallel demodulator to form two frames FSP1(k) and FSP1(k+1), respectively. At the same time, a second receive beamformer, positioned in parallel with the first receive beamformer and having two other sets of speckle-affecting parameters ($SP2_0$ and $SP2_1$) in its memory, processes the same component frames k and k+1 using the speckle-affecting parameter sets $SP2_0$ and $SP2_1$, respectively. The single-channel RF signals are processed by a second parallel demodulator to form two frames FSP2(k) and FSP2(k+1), respectively. According to a preferred embodiment, the frames FSP1(k) and FSP2(k) are combined to form a frame FSP(k), and the frames FSP1(k+1) and FSP2(k+1) are combined to form a frame FSP(k+1). The frames FSP(k) and FSP(k+1) are compounded (along with frames FSP(k+2), FSP(k+3), . . . similarly formed) using the compounding methods described supra with respect to FIG. 6.

In another example of the above preferred embodiment, intra-frame harmonic compounding may be combined with decorrelated inter-frame compounding to produce an output with a desirable amount of speckle reduction. In particular, in an ultrasound system in which the transmit beamformer has a transmit frequency of $f_0$, three parallel demodulators having local oscillator frequencies of $0.5f_0$ (a subharmonic of the transmit frequency), $f_0$ (the transmit frequency), and $2f_0$ (a harmonic of the transmit frequency), respectively, may be used to form the frames FSP1(k), FSP2(k), and FSP3(k), respectively, for the $k^{th}$ frame. For the next frame k+1, the three demodulators produce the frames FSP1(k+1), FSP2(k+1), and FSP3(k+1) also using local oscillator frequencies of $0.5f_0$, $f_0$, and $2f_0$, respectively. Importantly, at least one other speckle-affecting parameter used by the transmit beamformer, receive beamformer, or demodulator is different for frame (k+1) than for frame k. According to a preferred embodiment, the frames FSP1(k), FSP2(k), and FSP3(k) are combined to form a frame FSP(k), and the frames FSP1(k+1), FSP2(k+1), and FSP3(k+1) are combined to form a frame FSP(k+1). The frames FSP(k) and FSP(k+1) are compounded (along with frames FSP(k+2), FSP(k+3), . . . similarly formed) using the compounding methods described supra with respect to FIG. 6.

Whereas many alterations and modifications of the present invention will no doubt become apparent to a person of ordinary skill in the art after having read the foregoing description, it is to be understood that the particular embodiments shown and described by way of illustration are in no way intended to be considered limiting. For example, a system in accordance with the preferred embodiments may be used with color Doppler systems, power Doppler systems, and other systems. In a Doppler system, for example, the transmit beamformer, receive beamformer, and demodulator may additionally use varying Doppler parameters for successive component frames to enhance their statistical decorrelation. Therefore, reference to the details of the preferred embodiments are not intended to limit their scope, which is limited only by the scope of the claims set forth below.

What is claimed is:

1. A method for generating a compound ultrasound image, comprising the steps of:

generating a first component frame using a first set of speckle-affecting parameters;

generating a second component frame using a second set of speckle-affecting parameters, wherein said first and second sets differ by at least two speckle-affecting parameters; and forming the compound ultrasound image using said first and second component frames;

wherein each of said speckle-affecting parameters is an ultrasound system setting that, if changed in isolation between two otherwise identical ultrasound system configurations, would cause the ultrasound system to generate frames having at least partially decorrelated speckle patterns, each of said speckle-affecting parameters being associated with a decorrelation threshold, said decorrelation threshold being characterized in that, if said speckle-affecting parameter were changed in isolation by an amount less than said decorrelation threshold between two otherwise identical ultrasound system configurations, the ultrasound system would generate frames having only partially decorrelated speckle patterns, said decorrelation threshold being further characterized in that, if said speckle-affecting parameter were changed in isolation by an amount greater than said decorrelation threshold between two otherwise identical ultrasound system configurations, the ultrasound system would generate frames having substantially decorrelated speckle patterns, wherein said at least two speckle-affecting parameters of said first and second sets each differ by an amount less than their corresponding decorrelation thresholds.

2. The method of claim 1, further comprising the step of generating a third component frame using a third set of speckle-affecting parameters, wherein said first, second, and third sets each differ from each other by at least two speckle-affecting parameters, and wherein said third component frame is also used in said step of forming the compound ultrasound image.

3. The method of claim 1, further comprising the step of generating (N–3) additional component frames using an additional (N—3) sets of speckle-affecting parameters, wherein each of said N sets each differ from each other by at least two speckle-affecting parameters, and wherein all N component frames are used in said step of forming the ultrasound image.

4. The method of claim 1, wherein said speckle-affecting parameters are selected from the group consisting of at least one transmit beamformer parameter and at least one receive beamformer parameter.

5. The method of claim 1, wherein said speckle-affecting parameters are selected from the group consisting of at least one receive beamformer parameter and at least one demodulator parameter.

6. The method of claim 1, wherein said speckle-affecting parameters are selected from the group consisting of at least one transmit beamformer parameter and at least one demodulator parameter.

7. The method of claim 1, wherein said speckle-affecting parameters are selected from the group consisting of: transmit frequency, number of transmit cycles, number of transmit zones, transmit pulse shape, transmit focus profile, transmit focal point, transmit steering angle, transmit F-number, transmit focus algorithm identifier, transmit aperture setting, and transmit apodization profile.

8. The method of claim 1, wherein said speckle-affecting parameters are selected from the group consisting of: receive bandwidth, receive focus profile, receive focal point, receive steering angle, receive F-number, receive focus algorithm identifier, receive aperture setting, and receive apodization profile.

9. The method of claim 1, wherein said speckle-affecting parameters are selected from the group consisting of local oscillator frequency and receive pulse shape.

10. The method of claim 1, wherein said speckle-affecting parameters are selected from the group consisting of: transmit frequency, number of transmit cycles, number of transmit zones, transmit pulse shape, transmit focus profile, transmit focal point, transmit steering angle, transmit F-number, transmit focus algorithm identifier, transmit aperture setting, transmit apodization profile, receive bandwidth, receive focus profile, receive focal point, receive steering angle, receive F-number, receive focus algorithm identifier, receive aperture setting, receive apodization profile, local oscillator frequency, and receive pulse shape.

11. The method of claim 10, wherein first and second sets of speckle-affecting parameters differ by said transmit frequency parameter and said transmit focal point parameter.

12. The method of claim 1, wherein said component frames are compounded using a finite-impulse-response (FIR) method and N distinct weighting factors, whereby an output frame rate of said compounded images is equal to an acquisition frame rate of said component frames.

13. The method of claim 12, wherein N is equal to 4.

14. A method for generating a compound output image in an ultrasound system using partial frequency compounding, comprising the steps of:

generating a first component frame using a first transmit frequency and a first type of speckle-affecting parameter set at a first value;

generating a second component frame using (i) a second transmit frequency that differs from said first transmit frequency by an amount less than a decorrelation threshold, and (ii) said first type of speckle-affecting parameter set at a second value different than said first value; and forming the compound ultrasound image using said first and second component frames;

wherein said decorrelation threshold corresponds to a minimum transmit frequency shift required to establish two frames having decorrelated speckle patterns if no other ultrasound system parameters were changed;

and wherein said second value of said first type of speckle-affecting parameter differs from said first value by an amount sufficient to establish two frames having decorrelated speckle patterns even though said first and second transmit frequencies differ by less than said decorrelation threshold;

whereby said ultrasound system is capable of generating a reduced-speckle compound image without incurring spatial resolutions losses as great as those associated with inter-frame frequency differences greater than said decorrelation threshold.

15. The method of claim 14, wherein said step of generating said first component frame also uses a second speckle-affecting parameter set at a third value, and wherein said step of generating said second component frame also uses said second speckle-affecting parameter set at a fourth value different than said third value, whereby said first and second values of said first speckle-affecting parameter may be closer together in achieving said decorrelated speckle patterns than if said second speckle-affecting parameter were not varied between the component frames.

16. The method of claim 15, wherein said first speckle-affecting parameter is selected from the group consisting of at least one receive beamformer parameter and at least one demodulator parameter.

17. The method of claim 15, wherein said first and second speckle-affecting parameters are selected from the group consisting of: at least one transmit beamformer parameter other than transmit frequency, at least one receive beamformer parameter; and at least one demodulator parameter.

18. The method of claim 15, wherein said first and second speckle-affecting parameters are selected from the group consisting of: number of transmit cycles, number of transmit zones, transmit pulse shape, transmit focus profile, transmit focal point, transmit steering angle, transmit F-number, transmit focus algorithm identifier, transmit aperture setting, transmit apodization profile, receive bandwidth, receive focus profile, receive focal point, receive steering angle, receive F-number, receive focus algorithm identifier, receive aperture setting, receive apodization profile, local oscillator frequency, and receive pulse shape.

19. A method for use with an ultrasound imaging system comprising:

generating a first ultrasound frame using a first set of speckle-affecting parameters;

generating a second ultrasound frame using a second set of speckle-affecting parameters;

wherein said first and second sets of speckle-affecting parameters differ from each other in at least two speckle-affecting parameters; and using said first and second ultrasound frames to form at least one ultrasound image;

wherein each of said at least two speckle-affecting parameters is changed between the first and second ultrasound frames; and wherein the change in each of said at least two speckle-affecting parameters is by an amount that, when only one of said at least two parameters is changed between the first and second frames generated with said system in an ultrasound examination of a body, and no other changes are made, two respective images derived therefrom show no perceptible difference in visible speckle, and when each of said at least two parameters is changed by said amount, and the second frame is generated under conditions that are otherwise the same as for the first frame, said images show a perceptible difference in visible speckle.

20. A method as in claim 19 including using at least said first and second frames to form and display a compound ultrasound image.

* * * * *